United States Patent
Hattendorf et al.

(10) Patent No.: US 12,368,039 B2
(45) Date of Patent: Jul. 22, 2025

(54) ION SOURCE FOR INDUCTIVELY COUPLED PLASMA MASS SPECTROMETRY

(71) Applicant: ETH Zurich, Zürich (CH)

(72) Inventors: Bodo Hattendorf, Zürich (CH); Detlef Günther, Zürich (CH); Thomas Vonderach, Zürich (CH)

(73) Assignee: ETH ZURICH, Zürich (CH)

( * ) Notice: Subject to any disclaimer, the term of this patent is extended or adjusted under 35 U.S.C. 154(b) by 809 days.

(21) Appl. No.: 17/440,683

(22) PCT Filed: Mar. 16, 2020

(86) PCT No.: PCT/EP2020/057153
§ 371 (c)(1),
(2) Date: Sep. 17, 2021

(87) PCT Pub. No.: WO2020/187856
PCT Pub. Date: Sep. 24, 2020

(65) Prior Publication Data
US 2022/0181135 A1 Jun. 9, 2022

(30) Foreign Application Priority Data

Mar. 18, 2019 (EP) .................................. 19163530

(51) Int. Cl.
*H01J 49/00* (2006.01)
*G01N 15/14* (2006.01)
(Continued)

(52) U.S. Cl.
CPC ............ *H01J 49/105* (2013.01); *G01N 15/14* (2013.01); *H01J 49/0031* (2013.01);
(Continued)

(58) Field of Classification Search
CPC .... H01J 49/105; H01J 49/0031; H01J 49/045; H01J 49/04; G01N 15/14; G01N 15/149; G01N 2015/1006
(Continued)

(56) References Cited

U.S. PATENT DOCUMENTS

| 4,766,287 A | 8/1988 | Morrisroe et al. |
| 8,222,596 B2 * | 7/2012 | Tao ........................ H01J 49/105 |
| | | 250/281 |

(Continued)

FOREIGN PATENT DOCUMENTS

| CN | 102263004 | 11/2011 |
| CN | 102263004 A * | 11/2011 ............ H01J 49/105 |

(Continued)

OTHER PUBLICATIONS

International Search Report and Written Opinion dated May 27, 2020, International No. PCT/EP2020/057153, 14 pages.
(Continued)

*Primary Examiner* — Michael Maskell
(74) *Attorney, Agent, or Firm* — Foley & Lardner LLP

(57) ABSTRACT

An ICP source (100) for generating ions using an inductively coupled plasma is configured to be coupled to a mass spectrometer (200). The sample is introduced into the plasma along a downwards-pointing vertical direction (G) under the action of gravity. In this manner, the sample can reach the plasma regardless of its condition, e.g., regardless of droplet or particle size. Transport efficiencies of up to 100% can be achieved. The ICP source can be supplied with a continuous stream comprising the sample.

24 Claims, 10 Drawing Sheets

(51) Int. Cl.
*H01J 49/04* (2006.01)
*H01J 49/10* (2006.01)
*G01N 15/10* (2006.01)
*G01N 15/149* (2024.01)

(52) U.S. Cl.
CPC .... *H01J 49/045* (2013.01); *G01N 2015/1006* (2013.01); *G01N 15/149* (2024.01)

(58) Field of Classification Search
USPC ........................................ 250/281, 282, 288
See application file for complete search history.

(56) References Cited

U.S. PATENT DOCUMENTS

| | | | | |
|---|---|---|---|---|
| 8,935,101 | B2* | 1/2015 | Wright | H01J 49/0036 430/173 |
| 9,922,811 | B2* | 3/2018 | Gunther | H01J 49/04 |
| 2005/0211018 | A1 | 9/2005 | Jurewicz et al. | |
| 2011/0024615 | A1* | 2/2011 | Tanner | G01N 15/1459 250/288 |
| 2013/0118304 | A1 | 5/2013 | Lee et al. | |
| 2013/0270261 | A1 | 10/2013 | Hadidi et al. | |
| 2014/0077699 | A1 | 3/2014 | Boswell et al. | |
| 2014/0217630 | A1 | 8/2014 | Redjdal et al. | |
| 2014/0287162 | A1 | 9/2014 | Jordan et al. | |
| 2014/0353495 | A1* | 12/2014 | Inagaki | H01J 49/105 239/398 |
| 2015/0255262 | A1* | 9/2015 | Murtazin | G01N 21/714 250/288 |
| 2016/0025656 | A1 | 1/2016 | Jevtic et al. | |
| 2016/0270201 | A1 | 9/2016 | Nakagawa et al. | |
| 2019/0244799 | A1* | 8/2019 | Stephan | H01J 49/167 |

FOREIGN PATENT DOCUMENTS

| | | |
|---|---|---|
| EP | 3 382 740 | 10/2018 |
| GB | 2 506 892 | 4/2014 |
| JP | 2011-503548 | 1/2011 |
| JP | 2011503548 A * | 1/2011 |
| WO | WO-97/13141 | 4/1997 |
| WO | WO-2008/080224 | 7/2008 |
| WO | WO-2014/056807 | 4/2014 |

OTHER PUBLICATIONS

Montaser, "Inductively Coupled Plasma Mass Spectrometry", Wiley-VCH: Washington DC, 1998.
Shigeta et al., "Application of a microdroplet generator for an ICP-sector field mass spectrometer—optimization and analytical 25 characterization", J. Anal. At. Spectrom, 2013, 28, 646-656.
Stewart et al., "Time resolved measurements with Single Droplet Introduction to Investigate Space-Charge Effects in Plasma Mass Spectrometry", J. 10 Am. Soc. Mass Spectrom, 1999, 10, 159-174.
Tanner et al: "Flow cytometer with mass spectrometer detection for massively multiplexed single-cell biomarker assay", Pure & Applied Chemistry, vol. 80, No. 12, Jan. 1, 2009, pp. 2627-2641.
Verboket et al., "A New Microfluidics-Based Droplet Dispenser for ICPMS", Analytical Chemistry, 2014, 86, p. 6012.
A. Murtazin, S. Groh, and K. Niemax, "Measurement of element mass distributions in particle ensembles applying ICP-OES", J. Anal. At. Spectrom. 2010, 25, 1395-1401, DOI: 10.1039/c004946h.
J. Olesik and L. Bates, "Characterization of aerosols produced by pneumatic nebulizers for inductively coupled plasma sample introduction: effect of liquid and gas flow rates on volume based drop size distributions", Spectrochimica Acta Part B: 10 Atomic Spectroscopy, 1995, 50, 285-303, DOI 10.1016/0584-8547(94)00151-K).
M. Schild et al., "Replacing the Argon ICP: Nitrogen Microwave Inductively Coupled Atmospheric-Pressure Plasma (MICAP) for Mass Spectrometry", Anal. Chem. 2018, 90(22), 13443-13450, DOI: 10.102 I/acs.analchem.8b0325 I.
S. Gschwind et al., "Capabilities of inductively coupled plasma mass spectrometry for the detection of nanoparticles carried by 20 monodisperse microdroplets", J. Anal. At. Spectrom., 2011, 26, 1166-1174, DOI:0.1039/COJA00249F.
S. Gschwind et al., "Mass quantification of nanoparticles by single droplet calibration using inductively coupled plasma mass spectrometry", Anal. Chem. 2013, 85, 5875-5883, DOI: 10.1021/ac400608c.
Office Action on JP Patent Application No. 2021-556213 dated Jan. 30, 2024.

* cited by examiner

ION SOURCE FOR INDUCTIVELY COUPLED PLASMA MASS SPECTROMETRY

CROSS-REFERENCE TO RELATED APPLICATIONS

The present application is the U.S. National Stage of International Application No. PCT/EP2020/057153, filed Mar. 16, 2020, and claims priority to European Patent Application No. 19163530.9, filed Mar. 18, 2019, which is incorporated herein by reference in its entirety.

TECHNICAL FIELD

The present invention relates to an inductively coupled plasma (ICP) ion source configured to be coupled to a mass spectrometer. The invention further relates to an ionization system comprising the ICP source, to an ICP-mass spectrometry system, and to a corresponding method of ICP mass spectrometry.

PRIOR ART

Inductively coupled plasma mass spectrometry (ICP-MS) is an analytical technique for detecting and quantifying trace amounts of elements and/or isotope ratios in a sample. This is achieved by dissociating and ionizing the sample components in an ICP source using an inductively coupled plasma and then separating and detecting the ions using a mass spectrometer. ICP-MS systems were first introduced commercially in the early 1980s.

An ICP source usually comprises a plasma torch to confine the plasma discharge by means of a directed gas flow and to carry a sample aerosol into the center of the plasma discharge for dissociation and ionization. The sample aerosol is usually transported to the plasma discharge through a central injector tube of the torch. In almost all prior-art ICP-MS systems, the torch axis is oriented horizontally, and the sample aerosol accordingly is transported to the plasma discharge using a carrier gas that flows horizontally through a horizontal injector tube. The carrier gas flow must be carefully adjusted to optimize sample transport to the plasma discharge and to ensure that the sample reaches a position within the plasma from which it can be extracted into the mass spectrometer system at highest possible ion yield.

Even at optimized carrier gas flow rates, transport efficiencies can be very low in prior-art ICP-MS systems. This is particularly true for aerosols that contain relatively large objects like large droplets, particles or cells. In this connection, it is to be noted that prior-art sample introduction systems for liquid samples and suspensions typically comprise a pneumatic nebulizer, which creates a broad droplet size distribution, often followed by a spray chamber for removing larger droplets, e.g., droplets having more than 10 µm diameter, from the aerosol (see, e.g., J. Olesik and L. Bates, "Characterization of aerosols produced by pneumatic nebulizers for inductively coupled plasma sample introduction: effect of liquid and gas flow rates on volume based drop size distributions", Spectrochimica Acta Part B: Atomic Spectroscopy, 1995, 50, 285-303, DOI 10.1016/0584-8547(94)00151-K). With such systems, the efficiency of sample transfer into the ICP is typically in the range of 3 and 30%, depending on the nebulizer used. Specific nebulizers operating at very low liquid flow rates (<50 µL/min) may achieve higher efficiency, but their susceptibility to clogging makes them useful only for dilute solutions and suspensions with particles or cells in the low µm range.

There have been various attempts to improve sample introduction into an ICP-MS system. For instance, sample introduction systems using a monodisperse microdroplet generator were disclosed in the following documents: S. Gschwind et al., "Capabilities of inductively coupled plasma mass spectrometry for the detection of nanoparticles carried by monodisperse microdroplets", J. Anal. At. Spectrom., 2011, 26, 1166-1174, DOI: 0.1039/C0JA00249F; S. Gschwind et al., "Mass quantification of nanoparticles by single droplet calibration using inductively coupled plasma mass spectrometry", Anal. Chem. 2013, 85, 5875-5883, DOI: 10.1021/ac400608c; K. Shigeta et al., "Application of a microdroplet generator for an ICP-sector field mass spectrometer—optimization and analytical characterization", J. Anal. At. Spectrom. 2013, 28, 646-656, DOI: 10.1039/c2ja30207a. While these documents disclose that droplets can pass vertically through a so-called falling tube, the axis of the plasma torch is still oriented horizontally, and the droplets are eventually transported to the plasma in a horizontal direction using a horizontal carrier gas stream.

P. Verboket et al., "A New Microfluidics-Based Droplet Dispenser for ICPMS", Analytical Chemistry 2014, 86, p. 6012, DOI: 10.1021/ac501149a discloses a microfluidic dispenser for introducing microdroplets into an ICP-MS. The chip is coupled with a cyclonic adapter, a heated steel tube, a membrane desolvator and an ICP-MS unit. Although the droplets fall vertically through the steel tube, the ICP-MS unit is oriented horizontally in the usual manner, and the droplets are introduced into the ICP-MS unit along a horizontal direction.

WO 2008/080224 A1 discloses a flow cytometer that is coupled to an ICP-MS system. The plasma torch of the ICP source is oriented horizontally in the usual manner.

An exception from the usual horizontal orientation of the plasma torch in an ICP-MS system is reported in I. I. Stewart and J. W. Olesik, "Time resolved measurements with Single Droplet Introduction to Investigate Space-Charge Effects in Plasma Mass Spectrometry", J. Am. Soc. Mass Spectrom. 1999, 10, 159-174. The authors propose a vertically upwards-pointing orientation of the plasma torch. The ions from the plasma are analyzed with a vertically upwards-oriented mass spectrometer whose interface is coupled with the plasma torch. This arrangement was reported to achieve better signal stability and reproducibility regarding the droplet signals than prior-art systems. However, the vertically upwards-pointing setup requires very careful adjustment of the operating conditions in order to correctly transport the droplets into the plasma.

In the context of inductively coupled plasma optical emission spectroscopy (ICP-OES), different orientations of the plasma torch have been proposed. For instance, an upwardly pointing plasma torch is disclosed in A. Murtazin, S. Groh, and K. Niemax, "Measurement of element mass distributions in particle ensembles applying ICP-OES", J. Anal. At. Spectrom. 2010, 25, 1395-1401, DOI: 10.1039/c004946h. The plasma torch is employed for optical emission spectroscopy only and is incompatible with a mass spectrometer. U.S. Pat. No. 4,766,287, US 2015/255262 A1 and US 2016/0270201 A1 also disclose upwardly pointing plasma torches with a focus on applications in optical emission spectroscopy.

M. Schild et al., "Replacing the Argon ICP: Nitrogen Microwave Inductively Coupled Atmospheric-Pressure Plasma (MICAP) for Mass Spectrometry", Anal. Chem. 2018, 90(22), 13443-13450, DOI: 10.1021/acs.analchem.8b03251 discloses a nitrogen-sustained ICP source that is operated at microwave frequencies, coupled with a time-of flight mass spectrometer. The plasma source is called a "microwave inductively coupled atmospheric-pressure plasma (MICAP) source". It comprises an annular dielectric resonator made of a technical ceramic, which, when immersed in a microwave field, exhibits a bulk polarization current around the ring that oscillates with the microwaves' frequency. The dielectric resonator ring does not have a significant net electric potential, and energy coupling to the plasma is purely inductive. The plasma torch of the MICAP source is oriented horizontally. US 2016/0025656 A1 discloses the MICAP source in more detail.

WO 97/13141 discloses a microwave plasma monitoring system wherein a plasma flame is generated by microwaves in a waveguide, and optical emission from the flame is investigated by a spectrometer. In one embodiment, the plasma flame is oriented vertically in a downward direction. Different types of samples such as droplets or particles are introduced using a suction pump that regulates the gas flow. The plasma source is not an ICP source, and the system is designed for optical spectroscopy only and is not compatible with a mass spectrometer.

US 2014/0287162 discloses a downwardly oriented microwave plasma source for materials processing, e.g., for applying surface coatings or for powder production. Downwardly oriented plasma sources for materials processing are also disclosed in US 2005/0211018 A1, US 2014/0217630 A1, US 2013/0270261 A1 and US 2013/0118304 A1. These setups are designed for industrial applications in materials processing and are clearly unsuitable for elemental analysis of samples. All the less are these setups suitable to be coupled to a mass spectrometer.

US 2015/255262 A1 discloses an upwardly pointing plasma source. Droplets are supplied to the plasma torch by a single-droplet microdispenser (SDMD) having an upwardly pointing vertical orientation. The document mentions that the SDMD may also be oriented horizontally or downwardly.

SUMMARY OF THE INVENTION

In a first aspect, it is an object of the present invention to provide an ICP source configured to be coupled to a mass spectrometer, the ICP source enabling improved sample introduction into the plasma discharge.

This object is achieved by an ICP source according to claim 1. Further embodiments of the invention are laid down in the dependent claims.

The invention provides an ICP source for generating ions from a sample using an inductively coupled plasma. The ICP source is configured to be coupled to a mass spectrometer. According to the invention, the ICP source is configured to allow introduction of the sample into the plasma along a downwards-pointing vertical direction.

Sample introduction into the plasma therefore takes place from the top. The sample is introduced into the plasma along the direction of the gravity vector. Thereby, sample introduction is less sensitive to the carrier gas flow rate. It is even conceivable to introduce the sample without using any carrier gas flow at all, the sample trajectories before the entry of the sample into the plasma being determined exclusively by gravity. Thereby significant amounts of carrier gas can be saved, which is of some significance especially when the carrier gas is an expensive noble gas like argon or an argon-helium mixture. The size of droplets or objects (e.g. cells) that can reach the plasma is essentially only limited by the dimensions of the sample introduction system. Because impact of droplets or objects with the walls of the sample introduction system can be avoided, the proposed arrangement can reach up to 100% transport efficiency. Samples of any type and in any condition can be investigated, e.g., aerosols or single droplets or objects like solid particles or cells. High flexibility in terms of sample size, aerosol humidity and sample amount can be obtained. For instance, eukaryotic cells, whose diameter is typically about 10-150 μm, can reach the plasma independent of their size or mass. Droplets will reach the plasma independent of how much of the solvent had been evaporated during transport within the carrier gas. Throughput of the sample through the ICP source can be significantly increased over prior-art devices.

Extraction of ions from the plasma can likewise take place along the downwards-pointing vertical direction. To this end, the ICP source can have an extraction opening that is open towards the bottom, the extraction opening being located below the region where the plasma is formed in the ICP source. After extraction, the ions can be transferred to a mass spectrometer having any arbitrary orientation, using known ion optics elements such as electrostatic mirrors and/or bending magnets.

Normally the ICP source will comprise a plasma torch, i.e., an arrangement of (usually at least three, concentric) tubes for feeding gases to the region of the plasma discharge. One of these tubes usually serves for feeding the sample to the plasma. This tube is often called the injector tube. The injector tube is usually arranged centrally in the plasma torch and surrounded by other tubes. In the present invention, the longitudinal axis of the injector tube, if present, is oriented vertically, the injector tube having an upper end configured to receive the sample and a lower end configured to introduce the sample into the plasma. The extraction opening for extracting ions from the plasma can then advantageously be located below the lower end of the injector tube.

Since in the present invention the plasma torch is arranged above the region of the plasma discharge, components such as the connections for feeding gases to the plasma torch can be arranged above the plasma discharge. In order to protect such components from convective heat that is generated by sustaining the plasma discharge, the ICP source can comprise a metallic cooling plate that at least partially surrounds the plasma torch and thereby shields these components from the heat that is due to the plasma discharge. The cooling plate preferably extends in a horizontal plane. It can have a cutout that is configured to receive the plasma torch when the cooling plate is installed.

The ICP source can comprise a cooling system for actively cooling the metallic cooling plate by a forced flow of a fluid, e.g., a cooling gas like air or a cooling liquid like water, through the metallic cooling plate and/or through an additional component that is connected to the metallic cooling plate, e.g., through one or more metallic panels which connect the cooling plate to a torch box that encloses the plasma torch. To this end, the cooling plate and/or the component to which the cooling plate is connected can be provided with one or more bores extending in the plane of the cooling plate or the additional component for passing a flow of the cooling fluid (e.g., air or water) through these bores.

The ICP source will generally comprise an electromagnetic coupling element for feeding energy to the plasma by inductive coupling, so as to sustain the plasma discharge. The electromagnetic coupling element can, in particular, be an induction coil coupled to an RF generator via electrical conductors. Such an induction coil is usually operated in the frequency range between 10 and 100 MHz, e.g., at 27 or 40 MHz. In other embodiments, the ICP source can employ a ring-shaped dielectric resonator that is immersed in a microwave field, which can be generated, e.g., by a magnetron. The microwave field can be in a frequency range of, e.g., 1 to 10 GHz, a typical frequency being 2.45 GHz. An example is the so-called MICAP source disclosed in M. Schild et al., "Replacing the Argon ICP: Nitrogen Microwave Inductively Coupled Atmospheric-Pressure Plasma (MICAP) for Mass Spectrometry", Anal. Chem. 2018, 90(22), 13443-13450, DOI: 10.1021/acs.analchem.8b03251 and US 2016/0025656 A1, see section "Prior Art" above.

Regardless of the type of electromagnetic coupling element, the coupling element defines a longitudinal axis, which advantageously extends vertically. The coupling element can surround a lower end portion of the plasma torch. If a metallic cooling plate is present, the coupling element can be arranged below the cooling plate.

The ICP source can further comprise an RF generator for feeding energy to the electromagnetic coupling element. The term "RF generator" is to be understood broadly as encompassing any AC generator operating in a frequency range of at least 10 MHz to 10 GHz.

If the electromagnetic coupling element is an induction coil, it is advantageous to connect the induction coil to the RF generator via at least one metal bar (preferably two parallel metal bars) that extend in a horizontal direction. This makes it possible to place the induction coil at a horizontal distance from the RF generator to gain space. The metal bars can be made of any highly conducting material, in particular, copper, silver or gold, to minimize ohmic losses between the RF generator and the induction coil.

The ICP source can be combined with an aerosolization device to form an ionization system for obtaining ions from a bulk sample. Advantageously, the ICP source is coupled to the aerosolization device in such a manner that the aerosolized sample is transferred from the aerosolization device to the ICP source along the downwards-pointing vertical direction. In this manner the above-discussed advantages of the presently proposed vertical design of the ICP source are preserved also during the transfer of the aerosolized sample to the ICP source.

Depending on the type of sample, the aerosolization device can be constructed in different manners. In some embodiments, the aerosolization device can comprise a droplet generator for aerosolizing the sample by creating droplets. A vertically oriented falling tube can be coupled to the droplet generator. The falling tube allows the droplets to be transported downwards under the action of gravity. During their passage through the falling tube, the droplets can be reduced in size or completely dried by solvent evaporation. To this end, the falling tube can have a sample inlet, a gas inlet and an outlet, and the falling tube can be configured to receive droplets from the droplet generator at its sample inlet and to receive a gas flow at its gas inlet, so as to allow the droplets to move downwards under the action of gravity while being reduced in size by vaporization of the solvent into the gas flow. The outlet of the falling tube can be directly or indirectly connected to an inlet of the ICP source in such a manner that the aerosolized sample is transferred from the falling tube to the ICP source along the downwards-pointing vertical direction, without requiring horizontal sample transport by a carrier gas flow, as would be required in the prior art.

In other embodiments, the aerosolization device can comprise a nebulizer for aerosolizing the sample and a spray chamber coupled to the nebulizer, the spray chamber having a downwards-pointing outlet, the outlet of the spray chamber being connected to an inlet of the ICP source in such a manner that the aerosolized sample is transferred from the spray chamber to the ICP source along the downwards-pointing vertical direction.

In yet other embodiments, the aerosolization device can comprise a laser ablation cell, the laser ablation cell having a downwards-pointing outlet, the outlet of the laser ablation cell being connected to an inlet of the ICP source in such a manner that the aerosolized sample is transferred from the laser ablation cell to the ICP source along the downwards-pointing vertical direction. Various configurations of the laser ablation cell are conceivable.

Other types of aerosolization devices can also be employed.

In yet other embodiments, no separate aerosolization device is employed. Instead, the injector tube of the plasma torch can form a direct injection nebulizer for splitting a bulk sample liquid into droplets within the plasma torch, i.e., immediately before the sample enters the plasma.

The ICP source of the present invention can be combined with a flow cytometer. Typically, in a flow cytometer the sample is injected into a flow of a sheath fluid. The flow is broken up into droplets by a vibrating nozzle, each droplet containing ideally one cell or particle. The flow cytometer then analyzes the optical properties of the cell or particle just prior to or shortly after release of the droplet from the nozzle. The ICP source can be coupled to the flow cytometer in such a manner that the sample is transferred from the flow cytometer to the ICP source along the downwards-pointing vertical direction. In this manner, maximum transport efficiency from the flow cytometer to the ICP source can be ensured. All cell/particle sizes will fall down into the ICP source and can be analyzed by ICP-MS. This prevents cell or particle analysis being biased with respect to size or mass. The flow cytometry results for each individual cell or particle can be correlated with the mass spectrometry results for the very same cell or particle, thereby maximizing the information that can be obtained from a single cell or particle. To this end, the ICP-MS system may comprise a correlator configured to receive flow cytometry information from the flow cytometer and mass spectrometry information from the mass spectrometer and to correlate the flow cytometry information with the mass spectrometry information to obtain combined flow cytometry and mass spectrometry information for individual cells or particles.

Optionally the flow cytometer can be coupled to a cell sorter. In this case, objects (in particular, cells or nanoparticles) that have passed the cell sorter are transferred from the cell sorter to the ICP source along the downwards-pointing vertical direction. In particular, the cell sorter can be an electrostatic cell sorter, wherein an electrical charge is provided to the droplet depending on the result of the flow cytometry analysis. The charged droplet then falls through an electrostatic deflection system that diverts droplets into different containers depending on their charge. Instead of collecting droplets of a particular charge state, these droplets can be directly passed on to the ICP source by allowing the droplets to vertically fall down into inlet of the ICP source.

The flow cytometer or cell sorter can be directly coupled to the ICP source. Optionally a falling tube as described above can be provided between the flow cytometer or cell sorter and the ICP source in order to reduce the size of the droplets before they enter the plasma.

In contrast to prior-art devices, the ICP source of present invention enables a sample to be transferred to the sample introduction system of the ICP source in the form of a continuous fluid stream. In particular, the sample introduction system of the ICP source of the present invention can be coupled to any type of continuous-flow liquid sample supply system that provides continuous sample flow, e.g., to a pump or to a continuous-flow sample pretreatment device. In the case of a pump, the pump may be a peristaltic pump. In the case of a sample pretreatment system, the pretreatment system may be a device for the separation of chemical species in the sample, like a chromatography device or an electrophoresis device, or a device for separating an ensemble of biological cells like a cell sorter coupled to a flow cytometer. In contrast to prior-art devices, the ICP source of present invention enables the sample to be transferred from the continuous liquid sample supply system to the ICP source in the form of a continuous fluid stream, without a need for intermediate offline storage.

Expressed in general terms, an ionization system is provided, the ionization system comprising:
  a continuous-flow sample supply system;
  a sample introduction system; and
  the ICP source as described above,
    wherein the sample introduction system is coupled to the continuous-flow sample supply system in such a manner that a continuous sample stream comprising the sample is transferred from the continuous-flow sample supply system to the sample introduction system, and
    wherein the sample introduction system is configured to introduce the sample into the ICP source along the downwards-pointing vertical direction.

The continuous-flow sample supply system may comprise a continuous-flow sample pretreatment device having an inlet configured to receive a continuous inflowing stream comprising the sample and having an outlet configured to provide a continuous outflowing stream comprising the sample, at least a portion of the continuous outflowing stream forming the continuous sample stream, the continuous-flow sample pretreatment device being configured to subject the continuous inflowing stream to at least one operation of analysis and/or modification of its composition.

Herein, analysis may be carried out by any known means, e.g., fluorescence detection, absorption measurements, spectral analysis etc. Likewise, modification of the composition of the inflowing sample stream may be carried out by any known means, e.g., filtering, retention by adsorption, modification by the application of electromagnetic fields etc. Importantly, there is no need for intermediate offline storage between sample pretreatment and introduction into the ICP source.

In particular, the continuous-flow sample pretreatment device may comprise a separation device, in particular, a chromatography device, an electrophoresis device or a cell sorter, configured to separate chemical species or particulate matter, in particular, cells, in the continuous inflowing stream and to elute the chemical species or the particulate matter after separation in the continuous outflowing stream.

Each of the inflowing stream, the outflowing stream and the sample stream may be a stream of a carrier fluid that carries the sample in dispersed or dissolved form. The fluid may be a liquid or a gas.

The outflowing stream from the separation device may have a flow rate that is much larger than the maximum flow rate that can be accepted by the sample introduction system. In order to deal with this situation, the ionization system may comprise a flow-splitting device configured to continuously split the continuous outflowing stream into the continuous sample stream and a residual stream.

The ionization system may further comprise a correlator configured to receive sample separation information from the separation device and mass spectrometry information from a mass spectrometer coupled to the ICP source and to correlate the sample separation information with the mass spectrometry information to obtain combined separation information and mass spectrometry information, e.g., LC/MS information.

The present invention also provides an ICP-MS system, comprising the ICP source of the present invention and a mass spectrometer coupled to the ICP source for receiving ions from the ICP source. The mass spectrometer can have any arbitrary orientation in space, and one or more ion optics elements can optionally be present to deflect the ions into the mass spectrometer after extraction from the ICP source.

In another aspect, the present invention provides a method of mass spectrometry comprising:
  sustaining a plasma using an ICP source;
  introducing a sample into the plasma so as to generate ions from the sample; and
  analyzing the mass-to-charge spectrum of ions that have been extracted from the plasma, using a mass spectrometer that is coupled to the ICP source,
    wherein the sample is introduced into the plasma along a downwards-pointing vertical direction.

In preferred embodiments, the ions are extracted from the plasma along the downwards-pointing vertical direction as well in order to transfer the ions to the mass spectrometer.

The method can further comprise:
  aerosolizing the sample using an aerosolization device; and
  transferring the aerosolized sample from the aerosolization device to the ICP source along the downwards-pointing vertical direction.

In particular, the method can comprise aerosolizing the sample using a droplet generator, passing the aerosolized sample through a vertically oriented falling tube along the downwards-pointing vertical direction, and introducing the aerosolized sample into an inlet of the ICP source along the downwards-pointing vertical direction.

In other embodiments, the method can comprise aerosolizing the sample using a nebulizer, passing the aerosolized sample through a spray chamber, the spray chamber having a downwards-pointing outlet, and introducing the aerosolized sample into an inlet of the ICP source along the downwards-pointing vertical direction.

In yet other embodiments, the method can comprise aerosolizing the sample using a laser ablation cell, the laser ablation cell having a downwards-pointing outlet, and transferring the aerosolized sample from the outlet of the laser ablation cell to the plasma along the downwards-pointing vertical direction.

In yet other embodiments, the method can comprise:
  analyzing at least one property of the sample using a flow cytometer; and
  transferring the sample from the flow cytometer into the ICP source along the downwards-pointing vertical direction.

The method can further comprise receiving flow cytometry information from the flow cytometer and mass spectrometry information from the mass spectrometer and correlating the flow cytometry information with the mass spectrometry information to obtain combined flow cytometry and mass spectrometry information for individual cells or particles.

In yet other embodiments, the method can comprise:

sorting sample droplets according to at least one property, in particular, according to an optical property, using a cell sorter; and transferring the sample droplets from the cell sorter to the ICP source along the downwards-pointing vertical direction.

In yet other embodiments, the method may comprise:

supplying, from a continuous-flow sample supply system, a continuous sample stream comprising the sample to a sample introduction system, wherein the sample is introduced into the plasma along the downwards-pointing vertical direction by the sample introduction system.

As outlines above, the continuous-flow sample supply system may comprise a continuous-flow sample pretreatment device having an inlet and an outlet. The method may then comprise:

receiving at the inlet a continuous inflowing stream comprising the sample;

subjecting the continuous inflowing stream to at least one operation of analysis and/or modification of its composition in the continuous-flow sample pretreatment device;

providing at the outlet a continuous outflowing stream comprising the sample; and causing at least a portion of the continuous outflowing stream to form the continuous sample stream.

As outlined above, the continuous-flow sample pretreatment device may comprise a separation device, in particular, a chromatography device, an electrophoresis device or a cell sorter. The method may then comprise separating chemical species or particulate matter, in particular, cells, in the continuous inflowing stream and eluting the chemical species or the particulate matter after separation in the continuous outflowing stream, using the separation device.

The method may comprise continuously splitting the continuous outflowing stream into the continuous sample stream and a residual stream.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
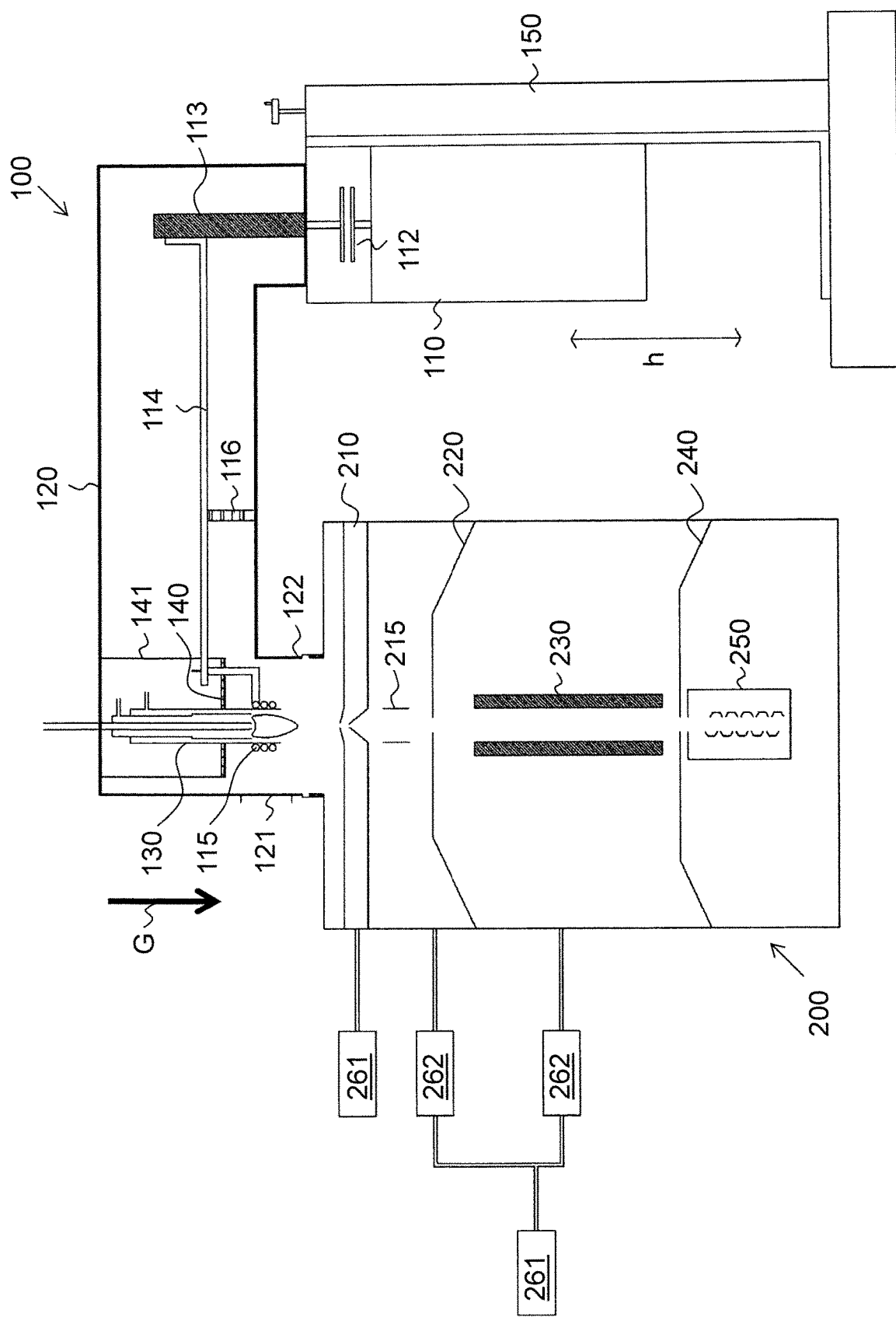
FIG. 1 shows a schematic sketch of an ICP-MS system according to an embodiment of the present invention.

FIG. 1 illustrates, in a highly schematic manner, an ICP-MS system according to an exemplary embodiment of the present invention. The ICP-MS system comprises an ICP source 100 for generating an argon plasma and a mass spectrometer 200 coupled to an outlet end of the ICP source.

In the present example, the ICP source 100 comprises an RF generator 110 mounted on an elevator 150 so as to be adjustable in height h relative to the mass spectrometer 200. The RF generator 110 feeds an alternating current in a frequency range of typically 10 to 100 MHz, e.g. at 27 MHz or 40 MHz, to a resonant circuit comprising a capacitor 112 and an induction coil 115. The capacitor 112 and one end of the induction coil 115 are electrically connected via a vertical metal bar 113 and via a horizontal metal bar 114 preferably made of a highly conductive metal like copper, silver or gold, supported by a PTFE support 116. Likewise, the other end of the induction coil 115 is electrically connected to the RF generator via another horizontal metal bar 114 and another vertical metal bar 113. By using the horizontal metal bars 114, it becomes possible to place the induction coil 115 in a location that is at a sufficiently large lateral distance from the RF generator 110 so as to arrange a mass spectrometer 200 below the induction coil 115 without interfering with the RF generator 110. A typical length of the horizontal metal bears 114 is 10 to 50 cm, in particular, about 20 cm.

Figure 2:
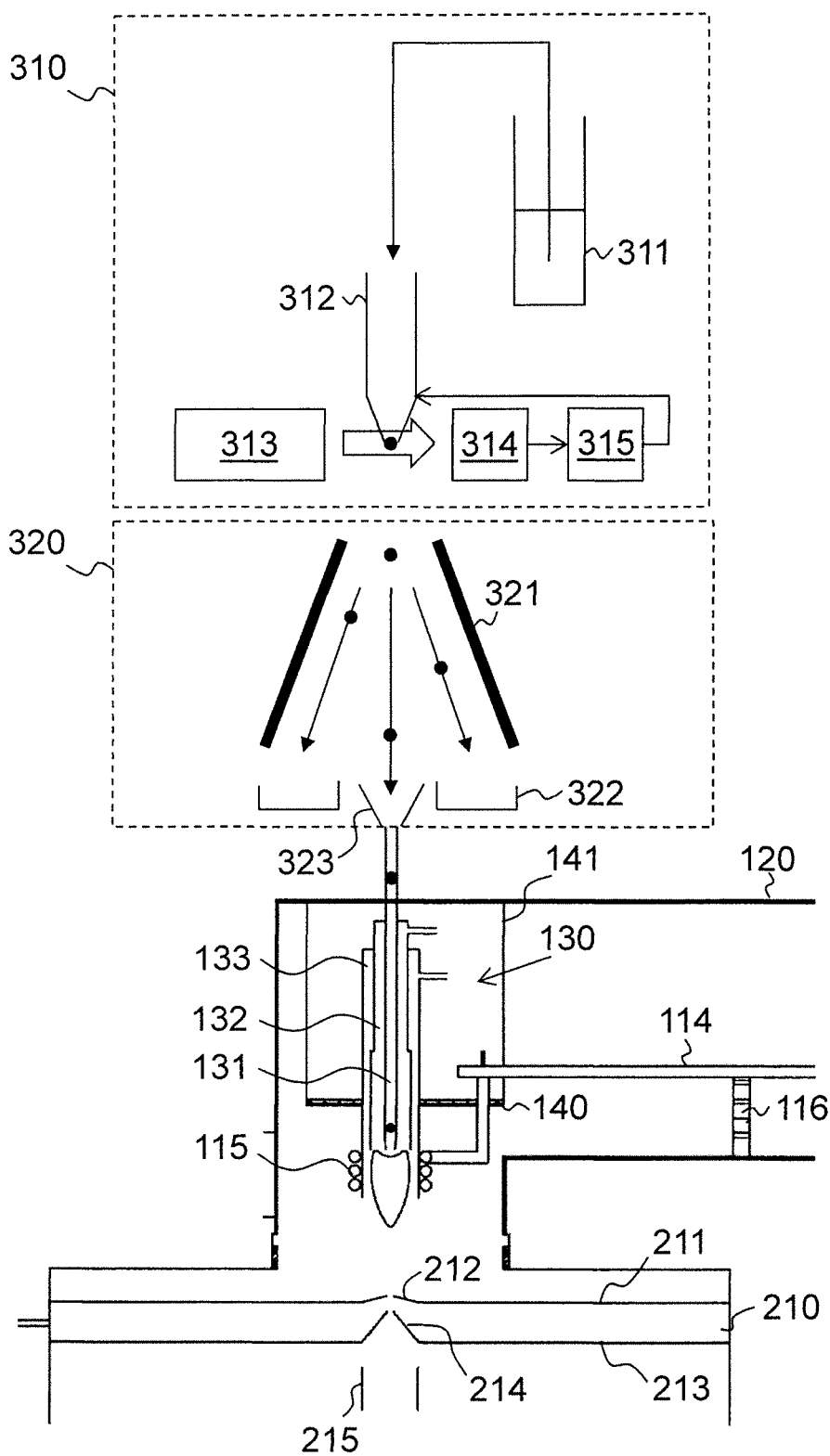
FIG. 2 shows an enlarged view of a portion of the ICP-MS system of FIG. 1 together with a highly schematic sketch of a cell sorter based on flow cytometry.

The ICP source 100 further comprises a torch box 120. The torch box 120 comprises a housing made of an electrically conducting metal in order to electromagnetically shield its interior. A plasma torch 130, which will be described in more detail below in conjunction with FIG. 2, is arranged in the torch box 120 together with the induction coil 115, the horizontal metal bars 114 and the vertical metal bars 113. The induction coil 115 surrounds a lower portion of the plasma torch 130. Above the induction coil 115, a horizontal cooling plate 140 is arranged. The cooling plate 140 is supported in the torch box 120 by two vertical, fluid-cooled metal panels 141 (cooled, e.g., by water or by a cooling liquid like a mixture of ethylene glycol and water). The cooling plate 140 protects the components in the torch box 120 that are arranged above the induction coil 115 from convective heat generated during operation of the ICP source. A ventilation grid 121 allows gases and heat to escape from the torch box 120.

At its outlet end 122, the torch box 120 is open towards the bottom and forms an extraction opening for interfacing the ICP source 100 to the mass spectrometer 200. The mass spectrometer comprises a vacuum interface 210 that will be explained in more detail below in conjunction with FIG. 2, followed by an ion optics unit 215, an inlet baffle 220, a quadrupole mass analyzer 230, an exit baffle 240, and a detector 250. A mechanical pump 261 evacuates the region of the vacuum interface 210. Turbo-molecular pumps 262 evacuate the region of the ion optics unit 215, mass analyzer 230 and detector 250. The setup of such a type of mass spectrometer is well known in the art; however, usually the extraction of ions from the ion source occurs horizontally, whereas the axis of ion extraction in the setup of FIG. 1 is oriented vertically downwards.

FIG. 2 illustrates the plasma torch 130 and the interface 210 to the mass spectrometer 200 in more detail. The plasma torch 130 is constructed in a manner well known in the art. It comprises three concentric tubes 131, 132, 133. A flow of a gas (typically argon) for forming the plasma is passed between the outer tube 133 and the middle tube 132 at a flow rate of typically 12 to 17 l/min. A second gas flow is passed between the intermediate tube 132 and the central tube 131 at a flow rate of 1 l/min and is used to sustain the plasma and adjust the position of the base of the plasma relative to the end of these tubes. The central tube 131, often called the injector tube, is employed for feeding the sample to the plasma.

The plasma torch 130 is positioned centrally in the induction coil 115. When RF power is applied to the induction coil 115, an intense electromagnetic field is created inside the induction coil 115. A high-voltage spark is used to ionize a fraction of gas inside the induction coil 115, and by acceleration of electrons and ions through the RF electromagnetic field a plasma can be sustained. The coupling between the coil and the plasma is inductive, i.e., energy transfer occurs predominantly by the magnetic field produced by the oscillating current in the induction coil, and only to a small extent by electric field gradient along the induction coil.

The sample is introduced into the plasma through the central tube (injector tube) 131 under the action of gravity. The plasma is sufficiently hot to progressively evaporate the sample, dissociate the sample, and ionize the elements contained in the sample.

The interface 210 to the mass spectrometer 200 is formed between a first baffle 211 that comprises a small opening in a so-called sampler cone 212 and a second baffle 213 that comprises a small opening in a so-called skimmer cone 214. A mechanical pump is connected to evacuate the interspace between the first and second baffles 211, 213. Ions that have passed both the sampler cone 212 and the skimmer cone 214 enter a space at high vacuum and are focused by an ion optics unit 215 into the mass analyzer.

FIG. 2 further schematically illustrates how the ICP-MS system of the present invention can be coupled to an electrostatic cell sorter 320, which in turn is coupled to a flow cytometer 310. Such a combination of a flow cytometer cooperating with a cell sorter is known in the art as a fluorescent-activated cell sorter. In the flow cytometer 310, a cell suspension 311 is fed to a nozzle 312. Droplets containing single cells are created by the nozzle 312. Each droplet is interrogated by one or more laser beams created by one or more lasers 313. Light along the direction of illumination as well as fluorescent light emitted by the droplet is detected by an optical detection system 314 and analyzed by an analyzer 315. Depending on the result of the analysis, the analyzer 315 applies a positive or negative charge to the nozzle tip or to a charging electrode so as to apply a charge of predefined sign to the droplet before it is discharged from the nozzle. In the cell sorter 320, the droplets are deflected according to their charge state by deflection plates 321 to which a DC voltage is applied. Depending on their charge state, droplets either end up in collection containers 322 or in a sample inlet 323. From the sample inlet 323, the droplets are transferred downwards directly into the injector tube 131 of the plasma torch 130, where they fall down vertically under the action of gravity.

The cell sorter 320 can also be omitted, and droplets that exit the flow cytometer 310 can be directly introduced into the plasma by placing the inlet of the ICP source directly under the output nozzle of the flow cytometer. No additional nebulization system is needed, and a transport efficiency of 100% can be obtained.

Regardless of whether the droplets are sorted or not, the results obtained from the flow cytometer 310 can be correlated with the results from the mass spectrometer 200 for each individual droplet. By combining flow cytometry with mass spectrometry in the presently proposed configuration, the number of cellular parameters that can be quantified simultaneously is increased when compared to flow cytometry alone or to mass spectrometry alone. To this end, the analyzer 315 can be configured to carry out correlations between flow cytometry and mass spectrometry results, or a separate correlator can be provided.

Figure 3:
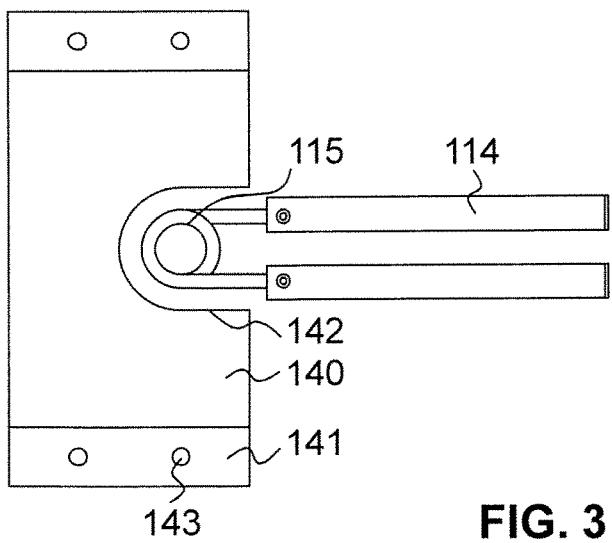
FIG. 3 shows a top view of the cooling plate of the ICP source in FIG. 1.

FIG. 3 illustrates the cooling plate 140 and the vertical metal panels 141 in greater detail. The cooling plate 140 has a cutout 142 for accommodating the plasma torch when the cooling plate is installed. The vertical panels are provided with a plurality of channels or bores 143, which extend in-plane within each of the panels, for passing a cooling fluid like cool air or water through the bores in order to actively cool the cooling plate.

Figure 4:
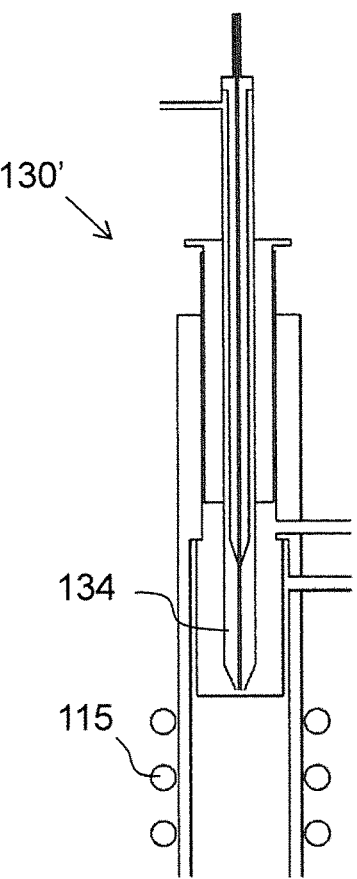
FIG. 4 shows a plasma torch configured as a direct injection nebulizer.

FIG. 4 illustrates a variant in which the plasma torch 130' is configured as a so-called direct injection high-efficiency nebulizer (DIHEN), which enables direct sample introduction into the plasma without the need of a separate aerosolization device. A high-efficiency nebulizer 134 replaces the injector tube in the plasma torch 130'. Thereby the sample can be directly introduced into the plasma without the need of prior aerosolization. 100% transport efficiency is thereby obtained. Such a direct injection nebulizer is known per se (A. Montaser, "Inductively Coupled Plasma Mass Spectrometry", Wiley-VCH: Washington D.C., 1998). However, normally it is operated in a horizontal configuration, whereas in the present invention the direct injection nebulizer is operated in a vertical configuration.

FIGS. 5 to 8 illustrate four examples of aerosolization devices coupled to the plasma torch 130 of the ICP source shown in FIG. 1. These Figures are schematic, and relative dimensions of the components shown in these Figures are not to scale.

Figure 5:
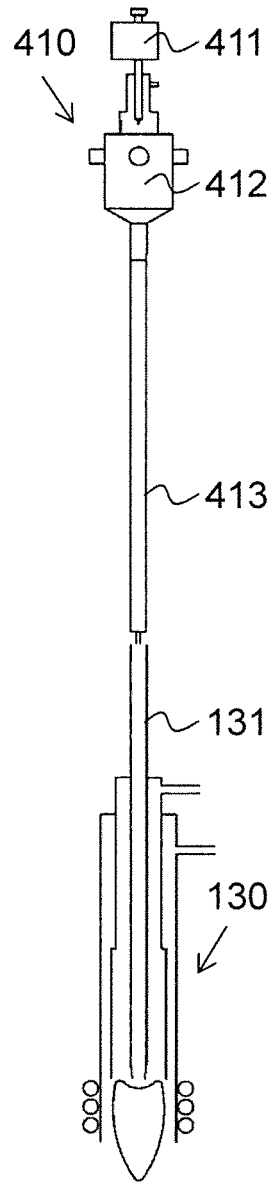
FIG. 5 shows a plasma torch coupled to a falling tube.

In FIG. 5, a droplet delivery and low-temperature desolvation system 410 is illustrated. A droplet dispenser 411 is connected to a flow adapter 412 that sits on top of a so-called falling tube 413. The falling tube 413 is a 40 cm long stainless steel tube with an inner diameter of 4 mm. A mixture of argon and helium is used to desolvate the droplets inside the falling tube 413. The desolvation of the droplets leads to reduced local cooling of the plasma. For more details, reference is made to S. Gschwind et al., "Capabilities of inductively coupled plasma mass spectrometry for the detection of nanoparticles carried by monodisperse microdroplets", J. Anal. At. Spectrom., 2011, 26, 1166-1174, DOI: 0.1039/C0JA00249F. Whereas in the prior art the aerosolized sample that leaves the falling tube 413 is transported horizontally to the ICP source using a carrier gas flow, in the present example the aerosolized sample is directly introduced into the injector tube 131 of the plasma torch along the downward direction, without requiring an additional carrier gas flow. In this manner, all sample droplets or particles that leave the falling tube 413 will reach the plasma, independently of their size, and independently of the gas flow rate.

Figure 6:
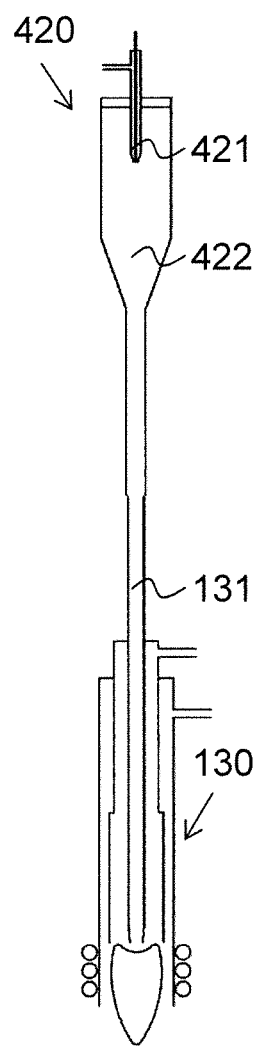
FIG. 6 shows a plasma torch coupled to a total consumption sample introduction system.

In FIG. 6, aerosolization is carried out by a so-called total consumption sample introduction system 420. A low flow nebulizer 421, usually operated at a liquid flow rate of less than 10 µL/min, is coupled to a small volume spray chamber 422, which forces the droplets generated by the nebulizer 421 down along its central axis and prevents the droplets from sticking to the walls of the spray chamber 422. The spray chamber 422 is open at its bottom to form an outlet. The outlet is directly coupled to the injector tube 131 of the plasma torch 130.

Figure 7:
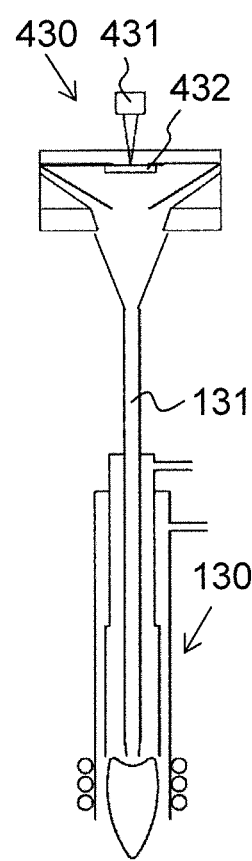
FIG. 7 shows a plasma torch coupled to a laser ablation cell according to a first embodiment.

In FIG. 7, a solid sample 432 is aerosolized in a laser ablation cell 430 using a laser 431. The laser 431 shines an intense pulsed laser beam onto the rear side of the sample 432, which faces away from the ICP source. The induced shock wave leads to an ejection of sample material, which falls down into the injector tube 131 of the plasma torch 130 ("rear side ablation").

Figure 8:
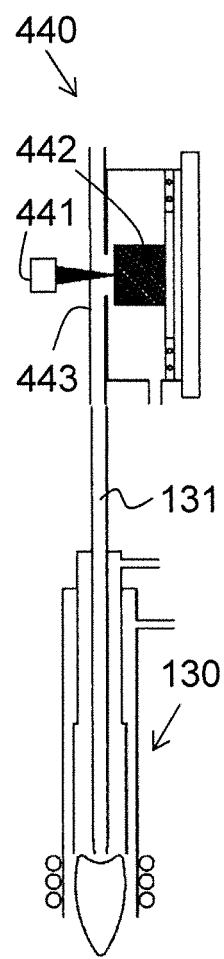
FIG. 8 shows a plasma torch coupled to a laser ablation cell according to a second embodiment.

FIG. 8 illustrates aerosolization using a laser ablation cell 440 according to U.S. Pat. No. 9,922,811 B2. A laser 441 shines laser onto a surface of a solid sample 442, causing sample material to be ablated. The ablated material enters a flow channel 443, from where it is directly transferred downwards into the injector tube 131 of the plasma torch 130. For more details of the laser ablation cell 440 and its mode of operation, reference is made to U.S. Pat. No. 9,922,811 B2. Whereas in the prior art the flow channel 443 is oriented horizontally and the laser beam impinges onto the sample surface vertically, in the present example the flow channel 443 is oriented vertically, and the laser beam is oriented horizontally.

Figure 9:
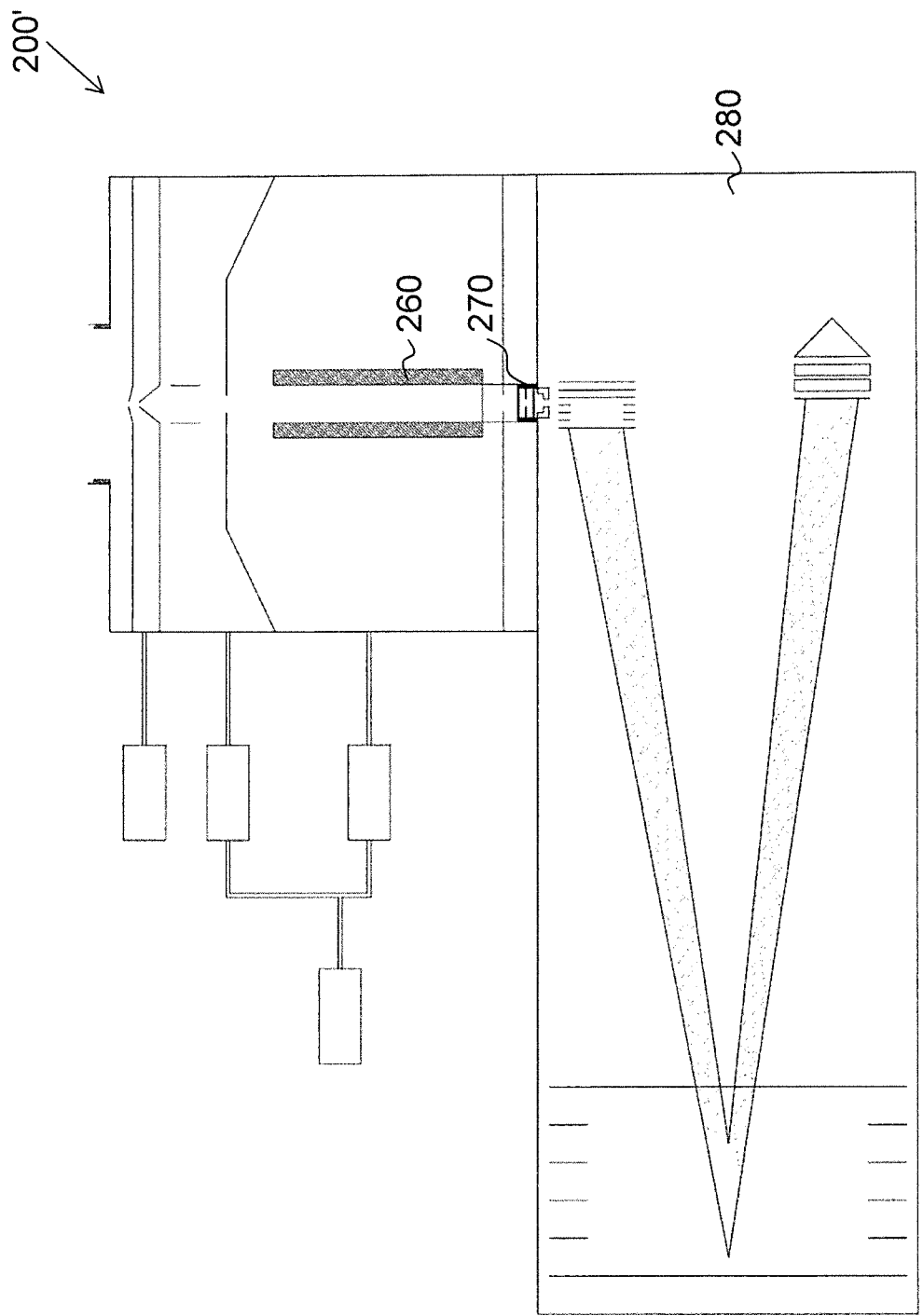
FIG. 9 shows a TOF mass spectrometer suitable to be coupled to the ICP source in FIG. 1.

The presently proposed ICP source can be used with any type and configuration of mass spectrometer. For instance, FIG. 9 illustrates a TOF mass spectrometer 200' that can be used in conjunction with the ICP source shown in FIGS. 1 and 2. The interface 210 is constructed in the same manner as in FIGS. 1 and 2. Ions extracted from the ICP source through the interface 210 are passed through a notch filter 260 and an extractor 270 into a TOF mass analyzer 280. Any other type and configuration of mass spectrometer can be employed. For instance, a quadrupole mass spectrometer, sector field mass spectrometer or an ion trap mass spectrometer can be used instead. If required, electrostatic mirrors and/or bending magnets can be used to deflect the ions into the mass spectrometer.

Figure 10:
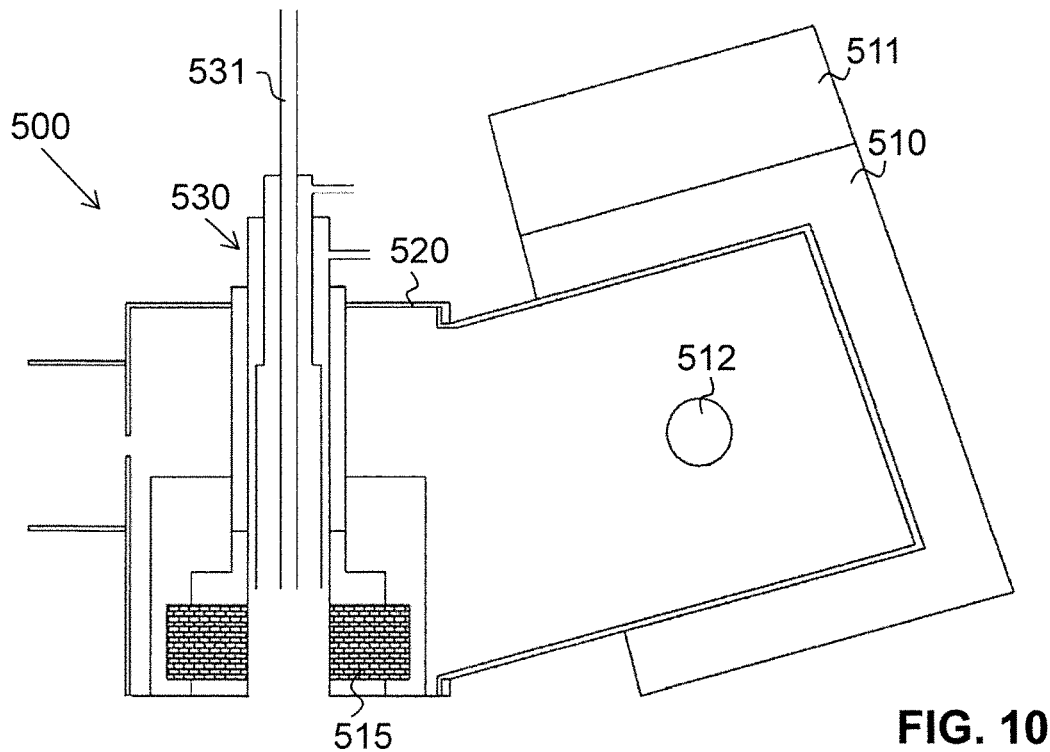
FIG. 10 shows a MICAP source according to an embodiment of the present invention.

FIG. 10 illustrates a microwave inductively coupled atmospheric-pressure plasma (MICAP) source 500 that is configured for vertical sample introduction. The MICAP source comprises an RF generator (microwave generator) 510 in the form of a magnetron. A fan 511 provides cooling for the magnetron 510. An antenna 512 couples the microwave field into the interior of the torch box 520. An annular dielectric resonator 515 is immersed in the microwave field. The resonator exhibits a bulk polarization current around the ring, which oscillates with the microwaves' frequency. A plasma torch 530 is arranged above the resonator 515. The plasma torch 530 is constructed in the same manner as the plasma torch 130 that has been described in conjunction with FIG. 2. Nitrogen gas is passed into the region of the center of the resonator 530. A nitrogen plasma is sustained by the electromagnetic field in the center of the resonator 515 by inductive coupling. For details, reference is made to US 2016/0025656 A1 and to M. Schild et al., "Replacing the Argon ICP: Nitrogen Microwave Inductively Coupled Atmospheric-Pressure Plasma (MICAP) for Mass Spectrometry", Anal. Chem. 2018, 90(22), 13443-13450, DOI: 10.1021/acs.analchem.8b03251. Whereas in the prior art the plasma torch of the MICAP source is oriented horizontally, in the present example the plasma torch 530 is oriented vertically, allowing introduction of the sample through the central tube 531 along the direction of the gravity vector.

FIGS. 11 to 16 illustrate experimental results that have been obtained with a setup as illustrated in FIG. 1.

Figure 11:
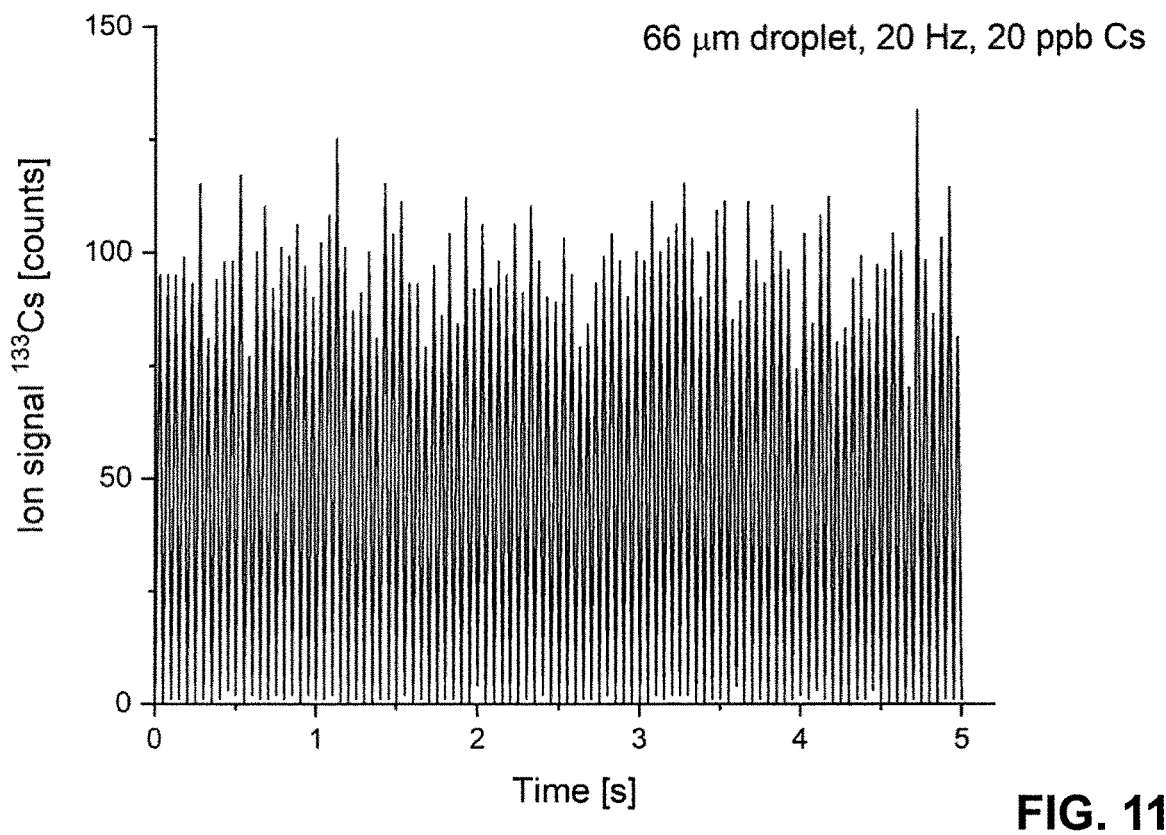
FIG. 11 shows a time-resolved ICP-MS peak trace of monodisperse droplets containing $^{133}Cs$.
Figure 12:
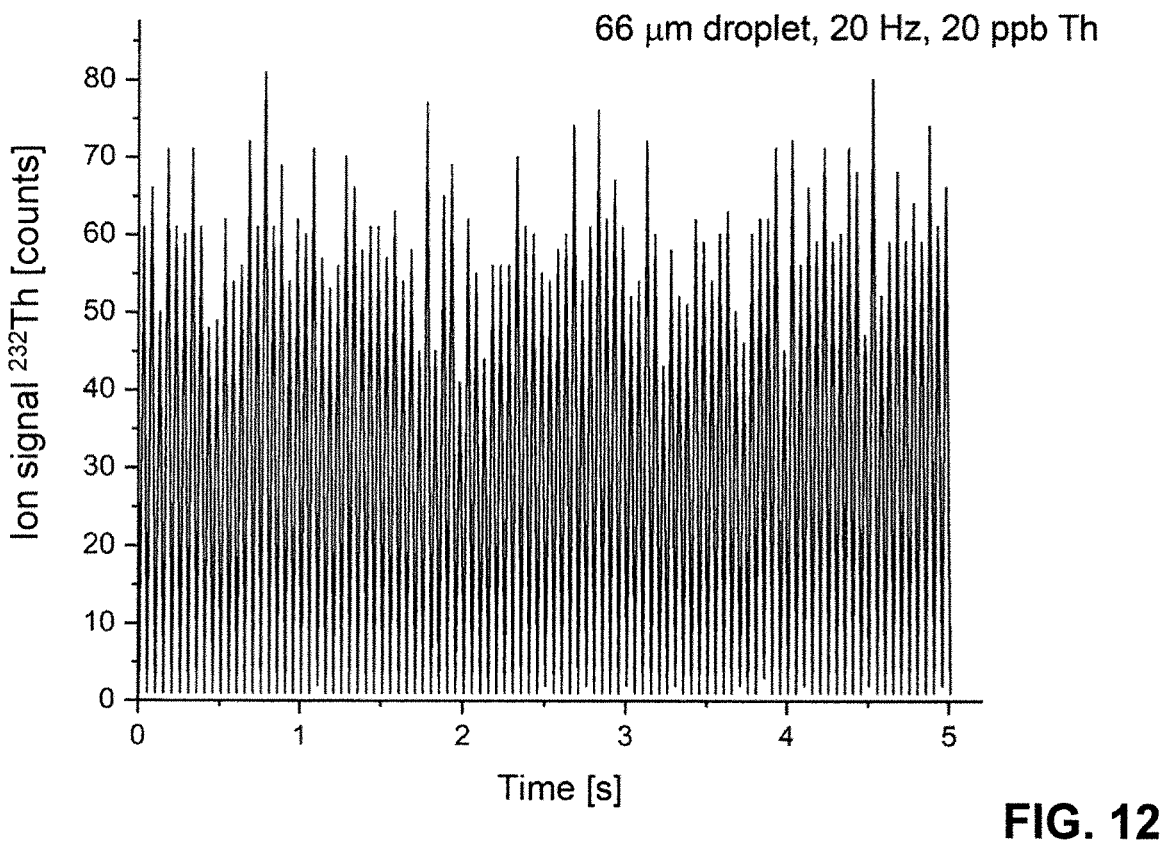
FIG. 12 shows a time-resolved ICP-MS peak trace of monodisperse droplets containing $^{232}Th$.

FIGS. 11 and 12 show time-resolved ICP-MS peak traces of monodisperse droplets containing $^{133}$Cs (FIG. 11) and $^{232}$Th (FIG. 12). Droplets of 66 µm diameter were generated at 20 Hz from a solution comprising 20 ppb each of both $^{133}$Cs and $^{232}$Th, using a droplet generator. All the dispensed droplets arrived in the plasma and were successfully detected by ICP-MS. It is noted that $^{133}$Cs possesses an ionization energy of 3.89 eV and $^{232}$Th an ionization energy of 6.31 eV. These results prove that the ICP-MS system of the present invention can readily achieve 100% transport efficiency.

Figure 13:
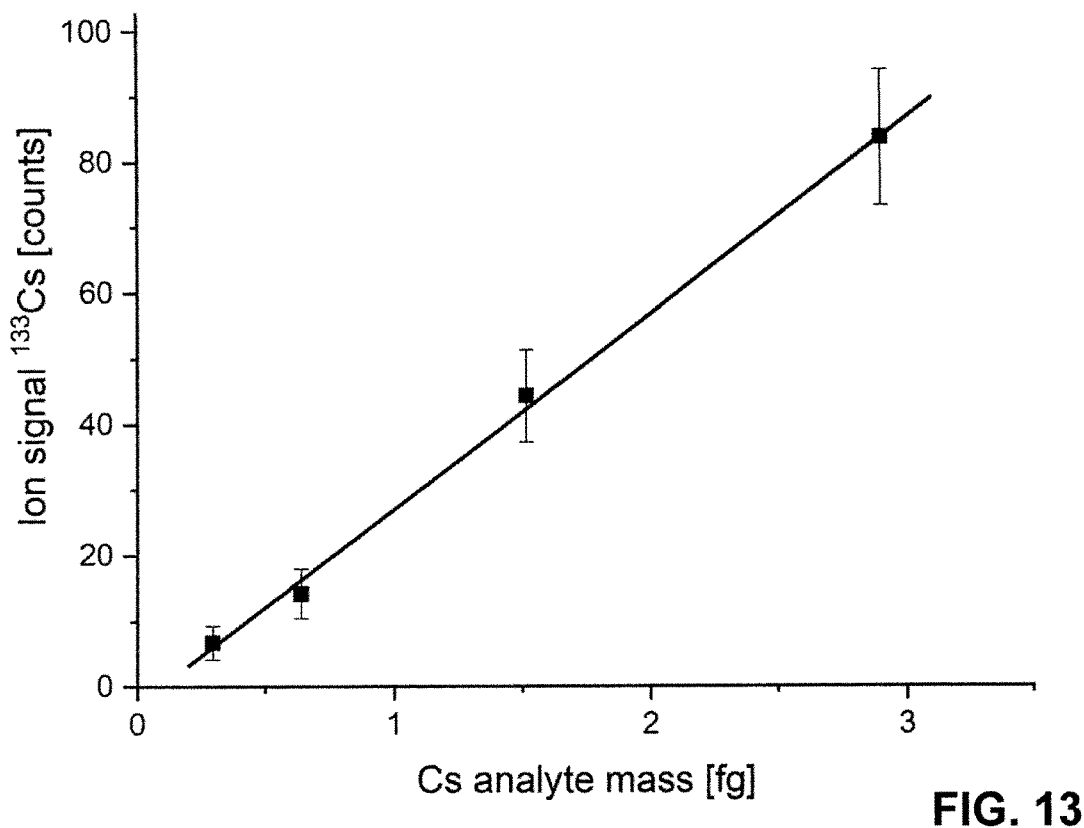
FIG. 13 shows a calibration curve illustrating the dependency of the ion signal on analyte mass for droplets comprising $^{133}Cs$.
Figure 14:
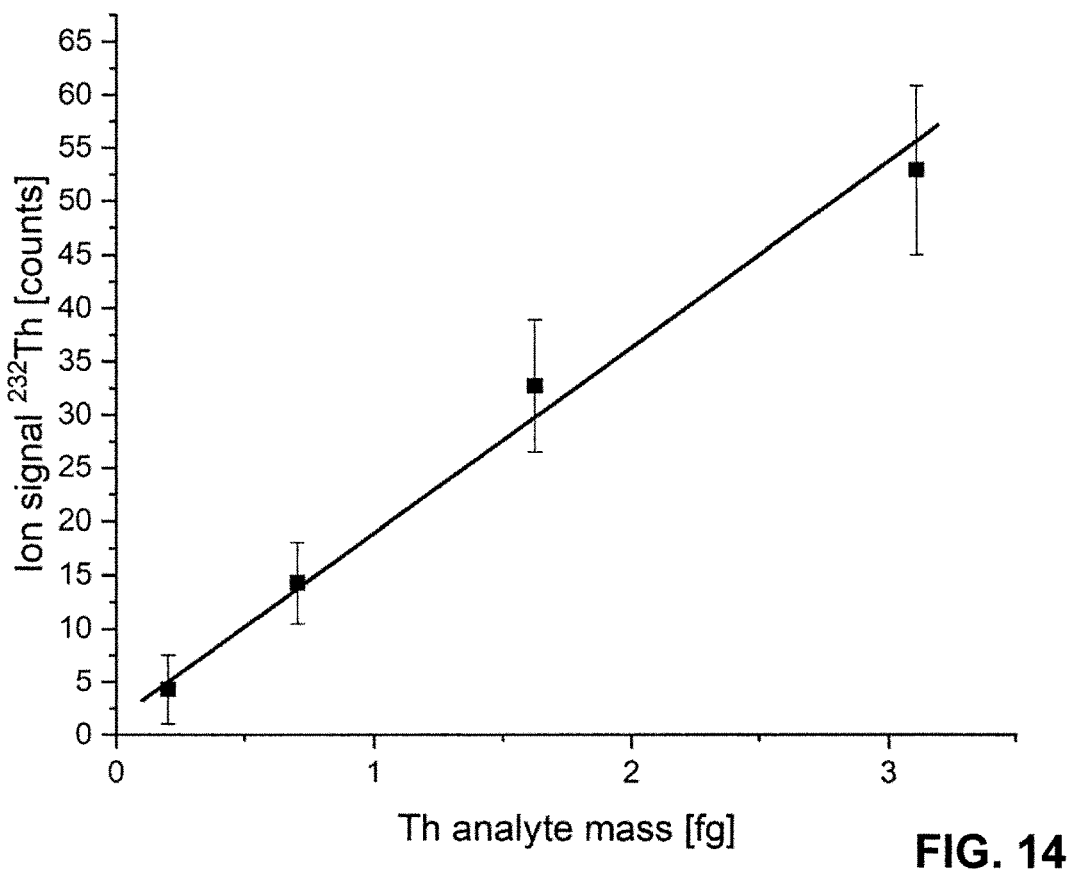
FIG. 14 shows a calibration curve illustrating the dependency of the ion signal on analyte mass for droplets comprising $^{232}Th$.

FIGS. 13 and 14 show diagrams illustrating the dependency of the ion signal on analyte mass for droplets containing $^{133}$Cs (FIG. 11) and $^{232}$Th (FIG. 12). These results were obtained by investigating monodisperse droplets having different analyte concentrations as follows: 2 ppb (leftmost data point), 5 ppb, 10 ppb and 20 ppb (rightmost data point), for both $^{133}$Cs and $^{232}$Th. Both diagrams exhibit a linear relationship between analyte mass and ion signal, indicating complete desolvation, vaporization, dissociation and ionization of the droplets using the vertical plasma configuration of the present invention.

Figure 15:
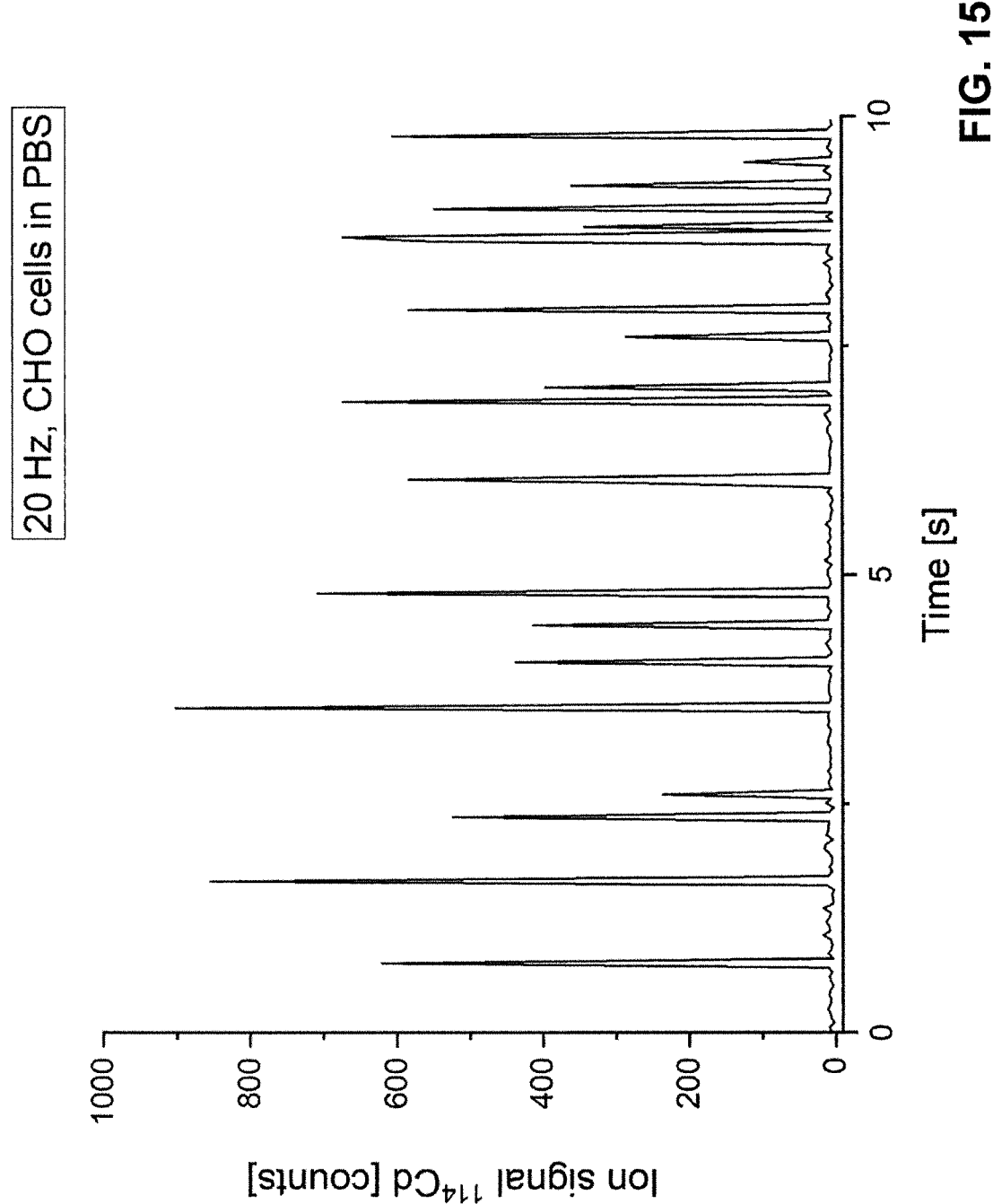
FIG. 15 shows a time-resolved ICP-MS peak trace for a Cd-enriched Chinese Hamster Ovary (CHO) cells suspension in phosphate-buffered saline.
Figure 16:
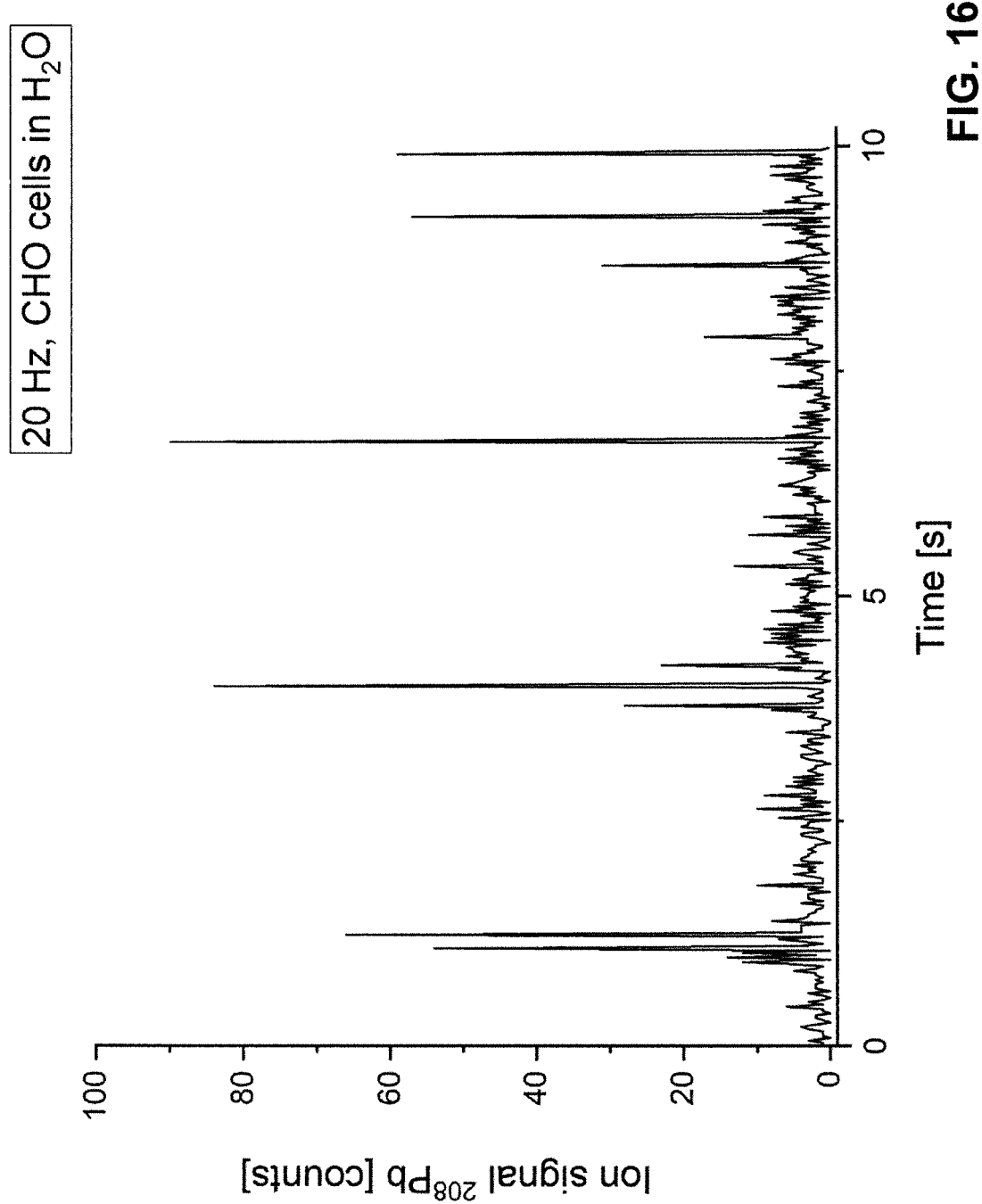
FIG. 16 shows a time-resolved ICP-MS peak trace for a Pb-enriched Chinese Hamster Ovary (CHO) cells suspension in water.

FIG. 15 shows a time-resolved ICP-MS peak trace for a Cd-enriched Chinese Hamster Ovary (CHO) cell suspension in phosphate-buffered saline. FIG. 16 shows a time-resolved ICP-MS peak trace for a Pb-enriched Chinese Hamster Ovary (CHO) cells suspension in water. These traces illustrate that cells can be successfully introduced into the plasma using the vertical configuration of the present invention. Since a transport efficiency of 100% is expected, it is believed that "missing" peaks are due to droplets that did not contain cells. On the other hand, it cannot be excluded that other droplets contained multiple cells.

Figure 17:
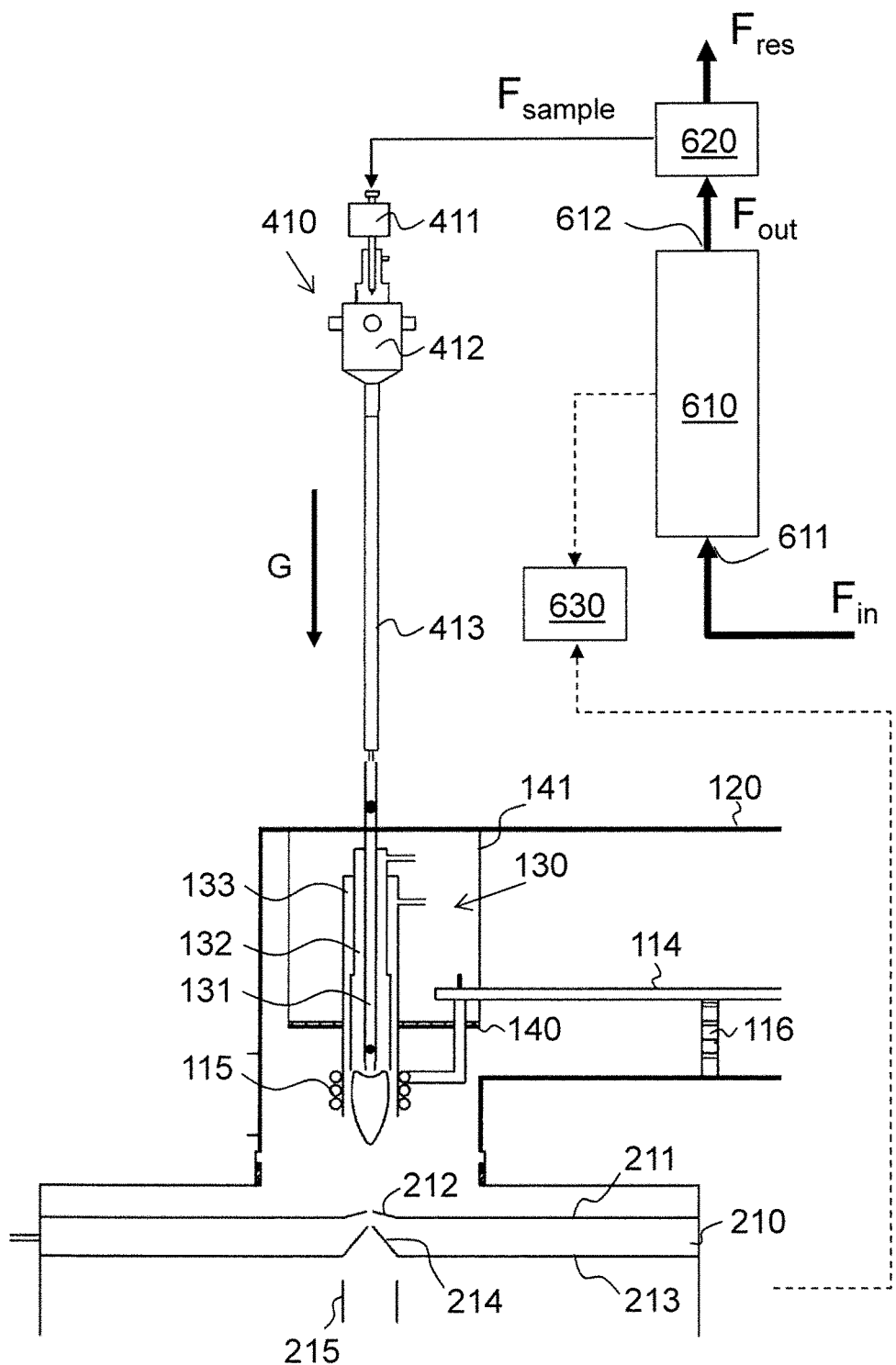
FIG. 17 shows an enlarged view of a portion of the ICP-MS system of FIG. 1 together with a highly schematic sketch of a sample pretreatment system, a flow-splitting device and a sample introduction system.

FIG. 17 schematically illustrates the coupling of an ICP-MS system according to an embodiment of the present invention to a continuous sample supply system comprising a sample pretreatment device 610. The sample pretreatment device 610 may be a separation device, for instance, a chromatography device such as a HPLC or GC device or an electrophoresis device such as a CE device. In other embodiments, the sample pretreatment device may be any other device that subjects an inflowing fluid stream that comprises the sample to some kind of analysis or treatment.

The sample pretreatment device 610 has an inlet 611 and an outlet 612. It receives at its inlet 611 a continuous inflowing fluid stream $F_{in}$. At its outlet 612, it provides a continuous outflowing fluid stream $F_{out}$. If the sample pretreatment device 610 is a separation device, the outflowing fluid stream $F_{out}$ may comprise a temporally varying composition, and the separation device may be configured to determine information about this composition, as it is well known in the art.

A flow-splitting device 620 is coupled to the output of the sample pretreatment device 610. The flow-splitting device 620 splits the continuous outflowing fluid stream $F_{out}$ into a sample stream $F_{sample}$ and a residual fluid stream $F_{res}$. The flow rate of the sample stream $F_{sample}$ may be much smaller than the flow rate of the residual fluid stream $F_{res}$. Apart from the different flow rates, the compositions of these two fluid streams may be identical.

The sample stream $F_{sample}$ enters a sample introduction system, which in the present example is configured as a droplet delivery and desolvation system as discussed above in conjunction with FIG. 5. However, any other sample introduction system that enables the introduction of a small continuous flow of fluid sample into the plasma of the ICP source may be employed. In particular, the sample introduction system may be a total consumption system, as in FIG. 6, or it may comprise the nebulizer of a DIHEN, as in FIG. 4. The sample introduction system may be integrated with the ICP source to form a single unit.

The flow-splitting device 620 is provided because flow rates at the outlet of some sample pretreatment devices, in particular separation devices like HPLC devices, are typically much larger than the flow rate that is required by the sample introduction system (e.g., between 0.1 and 10 μl/min using a droplet generation device at a rate of 1000 Hz). For some other sample pretreatment devices, e.g., some CE devices, the flow-splitting device 620 may not be required and can be left away.

The sample introduction system is arranged above the ICP source in such a manner that the sample is introduced into the ICP source along the downwards-pointing vertical direction G (i.e., along the direction of gravity).

A correlator 630 receives separation information about the various fractions that exit the sample pretreatment device 610. It further receives mass information about the mass distributions in the fractions from the mass spectrometer that is coupled to the ICP source. It correlates the separation information with the mass information as it is well known in the art, e.g., in the form of LC/MS, GC/MS or CE/MS information.

Many modifications are possible without leaving the scope of the present invention. In particular, other types of ICP source than the two types discussed above can be employed. The sample can be split up into small droplets or particles in other manners than discussed above. Any type and orientation of mass spectrometer can be employed.

The invention claimed is:

1. An ionization system comprising:
   a continuous-flow sample supply system for providing a continuous stream comprising a sample; and
   an ICP source for generating ions from the sample using an inductively coupled plasma, the ICP source being configured to be coupled to a mass spectrometer,
   wherein the ICP source is configured to allow introduction of the sample into the plasma along a downwards-pointing vertical direction, and
   wherein the ICP source is coupled to the continuous-flow sample supply system in such a manner that the sample is transferred from the continuous-flow sample supply system to the ICP source along a downwards-pointing vertical direction without intermediate offline storage.

2. An ionization system comprising:
   a continuous-flow sample supply system;
   a sample introduction system; and
   an ICP source for generating ions from a sample using an inductively coupled plasma, the ICP source being configured to be coupled to a mass spectrometer,
   wherein the ICP source is configured to allow introduction of the sample into the plasma along a downwards-pointing vertical direction,
   wherein the sample introduction system is coupled to the continuous-flow sample supply system in such a manner that a continuous sample stream comprising the sample is transferred from the continuous-flow sample supply system to the sample introduction system without intermediate offline storage, and
   wherein the sample introduction system is configured to introduce the sample into the ICP source along the downwards-pointing vertical direction without intermediate offline storage.

3. The ionization system of claim 2,
   wherein the continuous-flow sample supply system comprises a continuous-flow sample pretreatment device having an inlet configured to receive a continuous inflowing stream comprising the sample and having an outlet configured to provide a continuous outflowing stream comprising the sample, at least a portion of the continuous outflowing stream forming the continuous sample stream, the continuous-flow sample pretreatment device being configured to subject the continuous inflowing stream to at least one operation of analysis and/or modification of its composition.

4. The ionization system of claim 3, wherein the continuous-flow sample pretreatment device comprises a separation device configured to separate chemical species or particulate matter, in particular, cells, in the continuous inflowing stream and to elute the chemical species or the particulate matter after separation in the continuous outflowing stream.

5. The ionization system of claim 3, wherein the ionization system comprises a correlator configured to receive analytical information from the continuous-flow sample pretreatment device and mass spectrometry information from a mass spectrometer coupled to the ICP source and to correlate the analytical information with the mass spectrometry information.

6. The ionization system of claim 3, wherein the continuous-flow sample supply system comprises a flow-splitting device for continuously splitting the continuous outflowing stream into the continuous sample stream and a residual stream.

7. A method of mass spectrometry comprising:
   continuously supplying a continuous sample stream comprising a sample from a continuous-flow sample supply system to an ICP source without intermediate offline storage;
   sustaining a plasma using the ICP source;
   introducing the sample into the plasma along a downwards-pointing vertical direction so as to generate ions from the sample; and
   analyzing a mass-to-charge spectrum of ions that have been extracted from the plasma, using a mass spectrometer that is coupled to the ICP source.

8. The method of claim 7, wherein the ions are extracted from the plasma along the downwards-pointing vertical direction.

9. The method of claim 7, comprising:
   analyzing at least one property of the sample using a flow cytometer and/or sorting sample droplets according to at least one property using a cell sorter; and transferring the sample from the flow cytometer or cell sorter into the ICP source along the downwards-pointing vertical direction without intermediate offline storage.

10. The method of claim 7, comprising:
continuously supplying the continuous sample stream comprising the sample from a continuous-flow sample supply system to a sample introduction system without intermediate offline storage,
wherein the sample is introduced into the plasma along the downwards-pointing vertical direction by the sample introduction system without intermediate offline storage.

11. The method of claim 10,
wherein the continuous-flow sample supply system comprises a continuous-flow sample pretreatment device having an inlet and an outlet, and
wherein the method comprises:
receiving at the inlet a continuous inflowing stream comprising the sample;
subjecting the continuous inflowing stream to at least one operation of analysis and/or modification of its composition in the continuous-flow sample pretreatment device;
providing at the outlet a continuous outflowing stream comprising the sample; and
causing at least a portion of the continuous outflowing stream to form the continuous sample stream.

12. The method of claim 11,
wherein the continuous-flow sample pretreatment device comprises a separation device and
wherein the method comprises:
separating chemical species or particulate matter in the continuous inflowing stream and eluting the chemical species or the particulate matter after separation in the continuous outflowing stream, using the separation device.

13. The method of claim 11, further comprising:
continuously splitting the continuous outflowing stream into the continuous sample stream and a residual stream.

14. The ionization system of claim 4, wherein the separation device a chromatography device, an electrophoresis device or a cell sorter.

15. The method of claim 12, wherein the separation device is a chromatography device.

16. The method of claim 12, wherein the separation device is an electrophoresis device.

17. The method of claim 12, wherein the separation device is a cell sorter.

18. The ionization system of claim 4, wherein the separation device is an electrophoresis device.

19. The ionization system of claim 4, wherein the separation device is a cell sorter.

20. The ionization system of claim 1, wherein the continuous-flow sample supply system comprises a flow cytometer.

21. The ionization system of claim 20, comprising a correlator configured to receive flow cytometry information from the flow cytometer and mass spectrometry information from a mass spectrometer coupled to the ICP source and to correlate the flow cytometry information with the mass spectrometry information to obtain combined flow cytometry and mass spectrometry information for individual cells or particles.

22. The ionization system of claim 1, wherein the continuous-flow sample supply system comprises a cell sorter.

23. The ionization system of claim 1, wherein the continuous-flow sample supply system comprises a chromatography device.

24. The ionization system of claim 1, wherein the continuous-flow sample supply system comprises an electrophoresis device.

* * * * *